US007363263B1

(12) United States Patent
Magaram et al.

(10) Patent No.: US 7,363,263 B1
(45) Date of Patent: Apr. 22, 2008

(54) METHOD AND SYSTEM FOR REPRESENTING DEPENDENCIES IN A FINANCIAL PLAN

(75) Inventors: Justin B. Magaram, Kirkland, WA (US); David R. Parlin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/332,459

(22) Filed: Jun. 14, 1999

(51) Int. Cl.
*G06Q 40/00* (2006.01)

(52) U.S. Cl. ............................ 705/35; 705/36; 705/37; 705/38; 705/39; 705/40; 707/3; 707/200

(58) Field of Classification Search .................. 705/35, 705/36, 37, 38, 39, 10, 40; 707/3, 200
See application file for complete search history.

(56) References Cited

U.S. PATENT DOCUMENTS

| | | | | |
|---|---|---|---|---|
| 5,819,263 A * | 10/1998 | Bromley et al. | ................ | 707/3 |
| 5,991,745 A * | 11/1999 | Kiritz | ........................... | 705/38 |
| 6,012,043 A * | 1/2000 | Albright et al. | .............. | 705/36 |
| 6,012,044 A * | 1/2000 | Maggioncalda et al. | ...... | 705/36 |
| 6,021,397 A * | 2/2000 | Jones et al. | .................... | 705/36 |
| 6,064,984 A * | 5/2000 | Ferguson et al. | ............. | 705/36 |
| 6,430,542 B1 * | 8/2002 | Moran | ........................ | 705/36 |
| 6,684,190 B1 * | 1/2004 | Powers et al. | ................. | 705/4 |

OTHER PUBLICATIONS

Qureshi et al., "Artificial intelligence in accounting and business", National Public Accountant, 43, 7, 13(6), Sep. 1998.*
"Sun Delivers Cross-Platform Enterprise Load Testing Tool", Business Wire, Dec. 18, 1998.*
Porter et al., "Uses and abuses of financial modeling", Topics in Health Care Financing, v19, n1, p. 32(12), Fall 1992.*

* cited by examiner

*Primary Examiner*—Nga Nguyen
(74) *Attorney, Agent, or Firm*—Workman Nydegger

(57) ABSTRACT

A method and system architecture for managing the objects used in simulating a financial-type plan. Objects are hierarchically arranged with fields therein that specify financial information including dates, rates, amounts of objects and strings. The fields may be selectively chosen to be dependent on the dates, rates or amounts of other objects, whereby any change made to the value in one field is automatically linked to any related fields. Each field alternatively be given a fixed value, and fields, whether fixed or referenced to another field, may be accompanied by an adjustment field that offsets the value in the field. Objects may be grouped in packages, and objects and packages may be selectively enabled and disabled, whereby such objects will be included or omitted from the financial simulation calculations without having to reenter or delete those objects. The objects used in the financial planning may be synchronized with financial information from another program so as to use more updated amounts.

24 Claims, 10 Drawing Sheets

METHOD AND SYSTEM FOR REPRESENTING DEPENDENCIES IN A FINANCIAL PLAN

FIELD OF THE INVENTION

The invention relates generally to computer systems and application programs, and more particularly to computer software and data used in developing plans such as financial plans.

BACKGROUND OF THE INVENTION

To accurately model a person's or a family's financial plan requires managing a large number of variables. For example, to create a financial plan that is meaningful, the user needs to provide a lot of current information such as salary, debt and savings, and also needs to specify many future financial events, such as paying for a child's college education, getting a raise, contributing to a savings plan, and retiring. Present financial planning software uses the input information to develop a financial plan, typically by running a simulation with the input information and outputting whatever results.

Many financial events may be dependent on other financial events. For example, a user may plan to buy a boat as soon as a car is paid off. Although such a relationship is implicitly understood by a user, financial planning software does not capture these relationships. Although a few easily predictable relationships may be hard-coded into the software of a financial plan, usually the only way for a user to define these relationships in is by typing dates and/or amounts for one variable that are the same as dates and/or amounts on variable. For example, a user may enter, "Sell Current House in May, 2000" and then later enter "Buy New House in May, 2000."

There are two main problems with this approach. A first problem it that this approach makes it cumbersome to create the financial plan, because the user must be diligent about entering exactly the same dates and/or amounts on separate variables. Secondly, after a first draft of the plan is created, it is difficult to make changes to the plan because the user must manually maintain the implicit relationships between objects. Using the above example, if the user changed the sale date of Current House to July, 2001, the plan would be inaccurate until the user remembered to also change the purchase date of New House. As can be readily appreciated, more complex events such as retirement (e.g., wherein income and contributions to a savings plan cease, monthly commuting expenses change, and so forth) may require concurrent updates to many variables, of which even a careful user can easily lose track.

Moreover, present financial planning software does not make it easy for the user to see the impact of removing a financial event from their plan. For example, to see how much sooner a user could retire if the user sold a vacation home requires the user to delete an object that stores the vacation home information, run a new simulation, and then manually reconstruct the vacation home object if the user preferred the plan as it was before. If any variable information depends on the deleted object, such as monthly payments being made on the vacation home, the user must take this into consideration as well.

Still another drawback to existing financial planning software is that it is separated from the user's real day-to-day financial transactions, even for users that use an electronic "checkbook" type of software program for tracking day-to-day transactions. For example, if the user gets an unexpected bonus and pays off credit card debt with the bonus, the user has to separately input the new information into the electronic checkbook as well as the planning software. The planning software thus relies on the user to make appropriate updates, which tends to make a financial plan quickly outdated for many users. This is true even for things that seem relatively minor, as, for example, compound interest over a long time can amplify the effect of even what seems to be a relatively small transaction.

SUMMARY OF THE INVENTION

Briefly, the present invention provides a method and system/architecture wherein the user may selectively define variable input information, such as data corresponding to dates and amounts, to be fixed or dependent on other plan information. This is accomplished by storing the information in fields of hierarchically-arranged objects representing elements of the plan, while enabling the fields of those objects to store either fixed properties (e.g., values) or links relating the fields to properties in fields of other objects in the financial plan. In addition, the field of an object can store an offset, i.e., adjustment, whereby, for example, a field's value may be made dependent on the value in another field plus or minus the adjustment amount. Conditional dates are also possible, in which a user ties one event to another event that does not have any known or predictable date associated therewith, (e.g., retire when an asset reaches a certain value).

A related innovation is the ability to exclude objects from the financial plan without deleting them, and then later re-include these objects without recreating them. For example, the user can quickly see how their financial plan would be affected by not making a purchase, simply by turning off a check box in a user interface to that object. If the user prefers the financial plan with the purchase included, the user can again include the purchase by simply turning on the check box. When an object is excluded, all objects that depend on that object are automatically excluded as well. For example, if a savings plan is defined as a percentage of the income from a second job, excluding the job automatically excludes the saving plan. Moreover, the hierarchical organization of the objects enables the simultaneous disabling of multiple objects by disabling an object package comprising objects hierarchically below that disabled object package.

The objects of the present invention also may be synchronized with the objects of another program, such as daily financial transaction objects, e.g., those maintained in a checkbook-type software application. A benefit achieved by synchronization with another application's data is that the financial plan is automatically updated for users that select this feature, on a per-field or per object basis, based on the user's most-recent financial information.

Other benefits and advantages will become apparent from the following detailed description when taken in conjunction with the drawings, in which:

DETAILED DESCRIPTION OF THE PREFERRED EMBODIMENT

Exemplary Operating Environment

Figure 1:
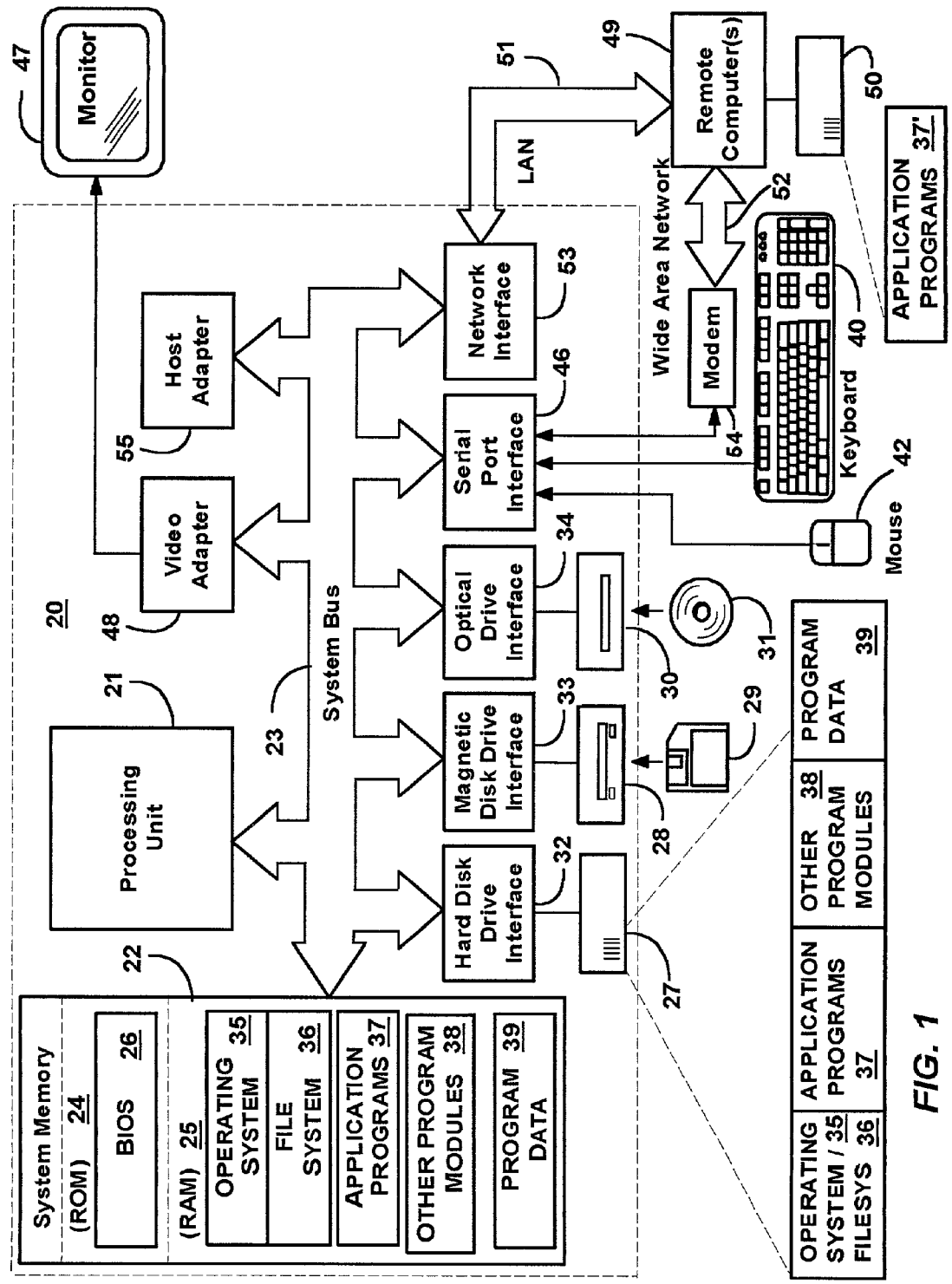
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows NT), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Financial Planning Engine

Figure 2:
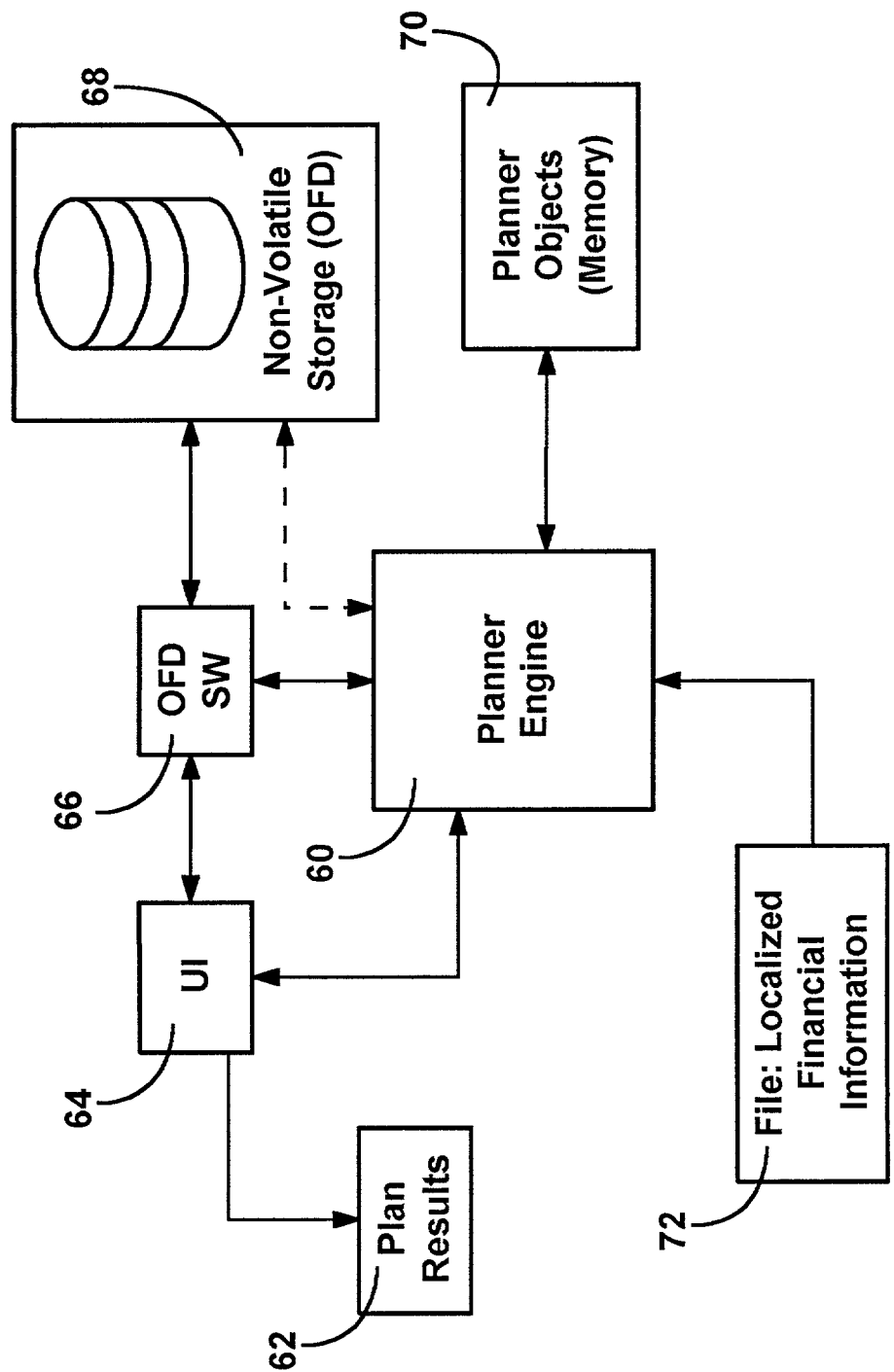
FIG. 2 is a block diagram representing various components for developing a financial plan in accordance with one aspect of the present invention.

As represented in FIG. 2, central to the functionality and primary purpose of the present invention is an engine 60 that develops a plan 62 from information input by the user.

Although not necessary to the present invention, the engine 60 preferably comprises a COM (component object model) object wherein other components (e.g., a debt planner, budgeter, accounts tracking component) access the methods of the engine 60 through object interfaces in accordance with the well-documented COM architecture. Note that while the present invention was originally implemented in a financial environment and thus includes examples directed to developing a financial plan, it should be understood that the present invention is not limited to relating financial data in a financial planning application program, but instead has numerous applications throughout user computing.

In a preferred embodiment, the user inputs financial information via a user interface component 64 plugged into to the planner engine 60. The user interface 64 is typically provided with the planner engine 60, however a custom user interface 64 may be developed and also plugged into the planner engine 60. The planner engine 60 may store the input information by passing it to open financial database (OFD) software 66, which maintains the information as associated object information in one or more appropriate data structures (an open financial database) in a non-volatile storage 68. As is known, the object instances themselves are generally not stored in the non-volatile storage 68, but rather classes (templates) of the objects are stored, along with instance information that is used to instantiate the object as needed. Nevertheless, for purposes of simplicity, the non-volatile storage 68 can be thought of as storing the objects, and the planner engine 60 as accessing these objects via the OFD software 66. Note that the OFD software 66 typically also handles daily financial transactions or the like, whereby some of the objects used in the plan (e.g., an object representing a checking account) may be used for tracking day-to-day finances and also used by the planner engine 60 in generating the financial plan. Alternatively, if no OFD software 66 is present, the planner engine 60 is arranged to read and write the object information directly to such a non-volatile storage 68, such as in a binary file, as indicated by the dashed line in FIG. 2.

For purposes of speed, the planner engine 60 preferably instantiates the objects into random access memory locations 70 when running a simulation, in an ordered arrangement as described below. Also, to develop a plan, the engine 60 may access localized financial information 72, such as current interest rates and/or stock values, for example by downloading such information when needed into a text file or the like from an external source such as the Internet.

Figure 3:
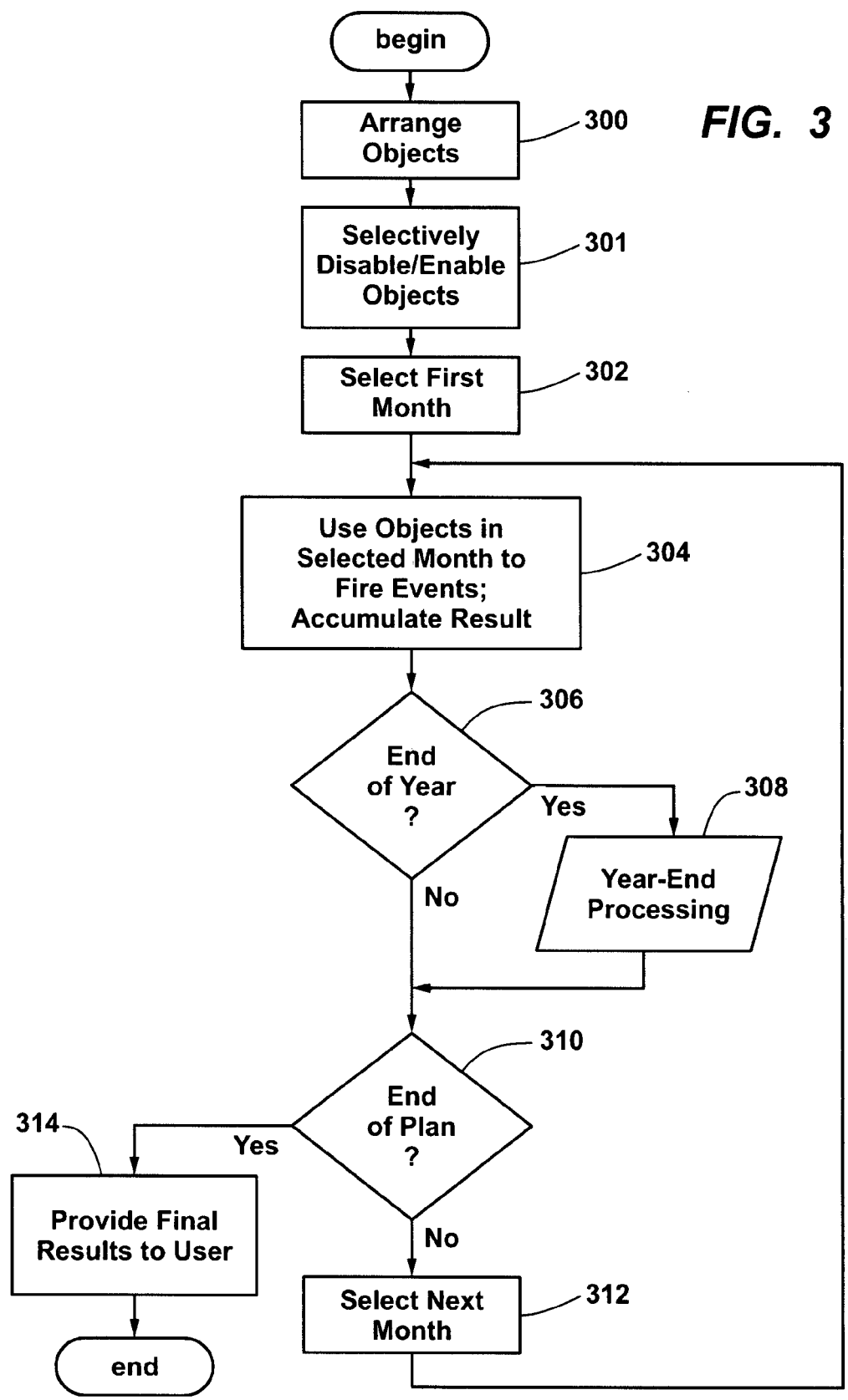
FIG. 3 is a flow diagram generally representing the steps taken to run a simulation and produce a financial plan in accordance with one aspect of the present invention.

Turning to the flow diagram of FIG. 3, to run the simulation, the planner engine 60 first arranges the plan's objects so that relevant ones can be quickly found. For example, the planner engine 60 will list the objects by date to group them with others in the same month so that the entire set of objects will not have to be searched repeatedly to see which ones apply in a given month. Step 300 of FIG. 3 generally represents the pre-arranging of the objects in this manner.

Once the objects are prepared at step 300, the planner selects the first month at step 302 and determines if any objects trigger an event in that month. By way of example, paychecks typically will be received in a month, bills will be paid, contributions to a retirement account may be made, and so forth, whereby objects representing such events will be used by the planner engine 60. Each object that pertains to the selected month is used to fire a corresponding event or events. For example, a paycheck object will fire an event that adds to savings, a credit card bill object's payment event will subtract from savings, a mortgage payment object's event or events subtract from savings while adding to the equity in a house asset object and increasing the value stored in a tax deduction object, and so forth. Note that an object that is processed in a given month and recognized by the planning object 60 as being one that will no longer apply (e.g., a loan object that becomes paid off) may be removed from the list of objects to process, whereby the planner engine 60 does not have to reevaluate such an object in future months only to repeatedly determine that it does not apply.

Step 306 tests to see if the selected month that was used to fire events corresponded to the end of the year, (typically December). If so, some special year-end processing may be performed as represented by step 308. For example, certain interest rates are compounded monthly, but actually described as a yearly rate, (e.g., six percent per year), whereby a user expects to see a return based on the yearly amount. The year-end processing will fire such events yearly rather than monthly so that the user is not given an incorrect number, e.g., a sum of money ($10,000) invested at six percent per year produces a different result ($10,600) than that same sum invested at one-half a percent per month (approximately $10,618).

Step 310 tests if the plan is completed, i.e., if the last month in the plan has fired the events based on that final month's relevant objects. The end date is determined by the estimated lifetime of one of the participants. If the plan is not complete, step 312 selects the next month, and returns to step 304 to fire events based on that next month's objects. If the plan is complete, the planner engine 60 provides a final result to the user via the user interface 64 (FIG. 2). Of course, the planner engine 60 can also display interim results through the user interface 64.

Object Dependencies

In accordance with one aspect of the present invention, there is generally provided a method and system/architecture wherein objects representing the elements and events for planning purposes are arranged such that their data, and thus their current interpretation, may be dependent on the data of another object. These dependencies are not hard-coded, but rather flexibly set by the user via the user interface 64 to meet a particular user's situation and needs. To this end, there is provided a highly flexible and extensible architecture wherein a user may relate fields of an object to the fields of other objects. The user interface 64 may be arranged to facilitate the use of such relationships, particularly those considered useful or desirable, or even or lead the user away from or prevent some undesirable relationships, but in general, the architecture enables virtually any type of relationship to be established and used.

Figure 4:
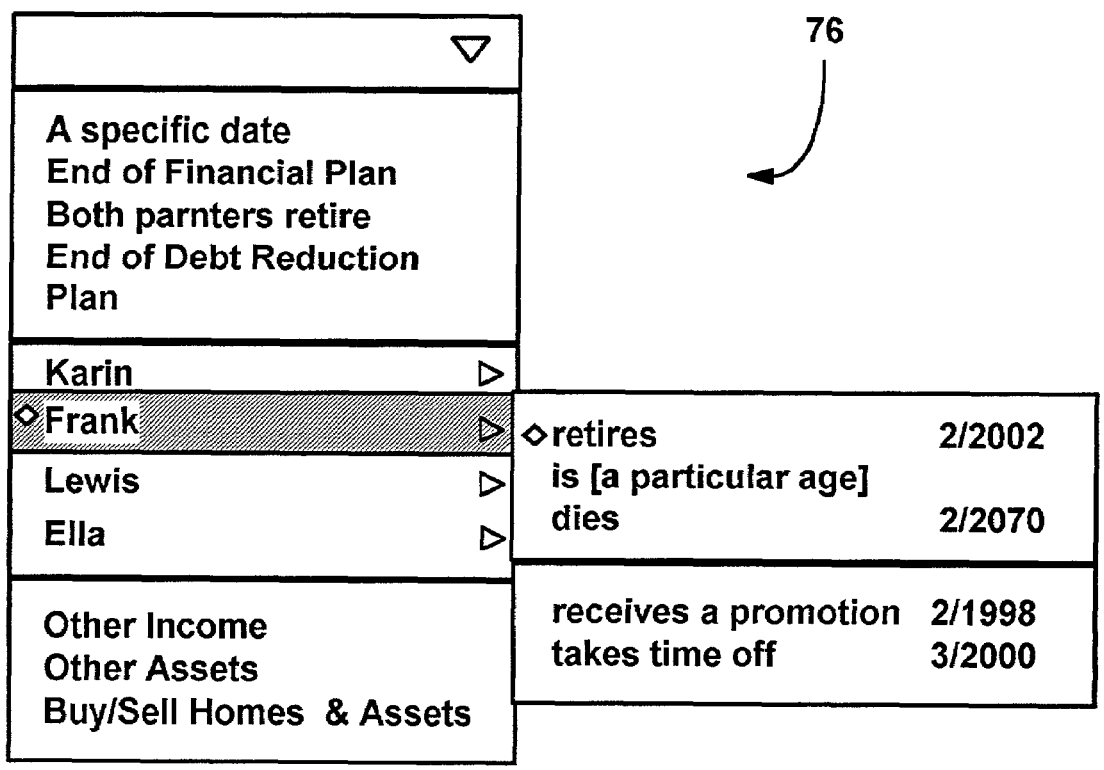
FIG. 4 is a representation of drop down menus of a user interface for inputting object information including object field dependencies in accordance with one aspect of the present invention.

FIG. 4 represents sample drop-down menus 76 that may appear via the user interface 64 (FIG. 2). As shown in FIG. 4, the user may make straightforward selections that automatically manage the dependencies between objects for the user. With such a user interface 64, the user need not enter formulas nor guess at which dependencies should be maintained, as the user can select from the menu options that are presented to enter the needed financial information. As a result, the plan is more comprehensible to the user because the user interface 64 uses everyday concepts and terminology. Moreover, the user generates a more credible and accurate plan because the user interface 64 provides relationships the user may need, and thereafter the relationships cause objects to be automatically updated when changes to other objects occur, without the user having to remember to manually make the update.

Figure 5:
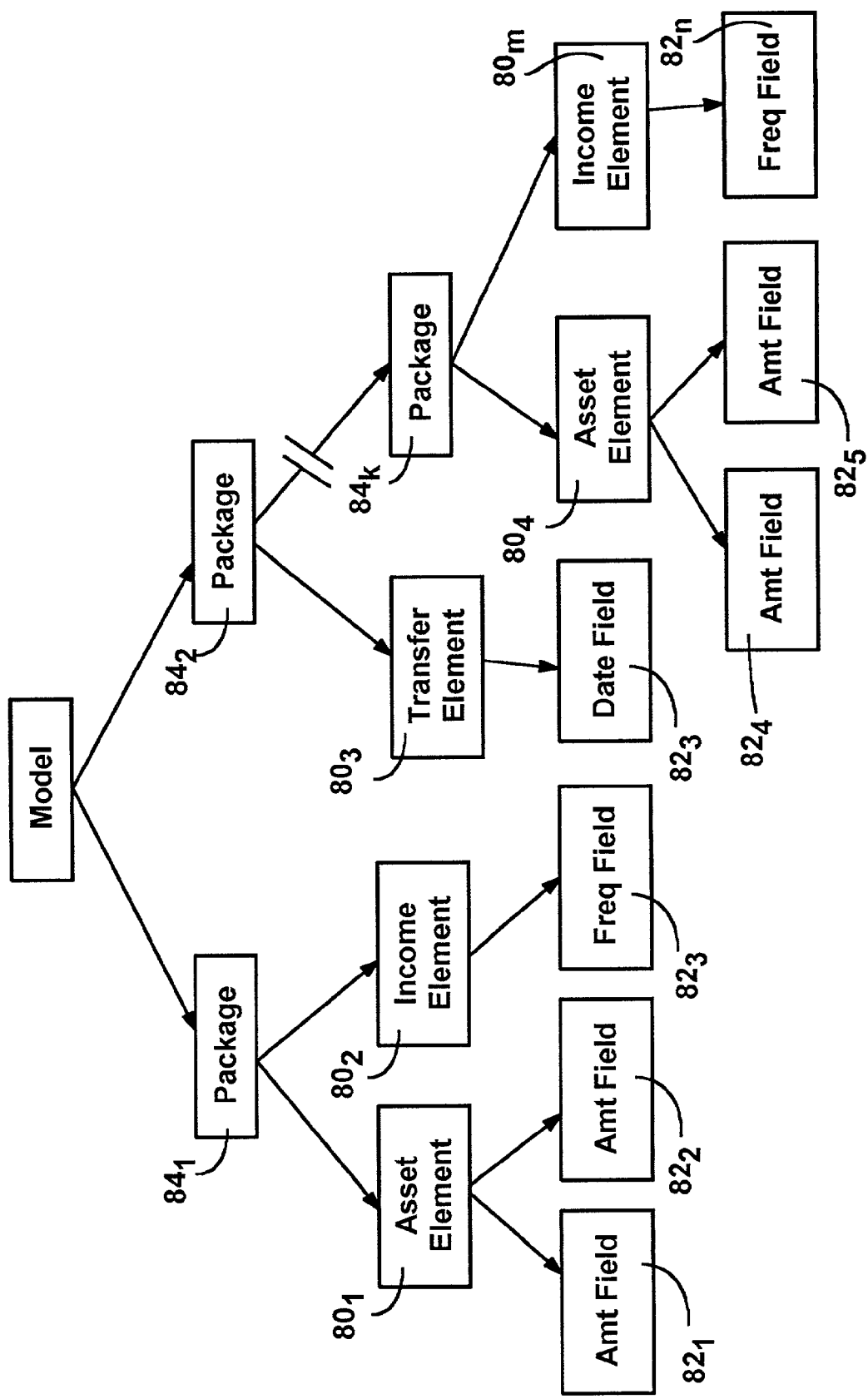
FIG. 5 is a representation of package objects, objects and their fields arranged in a hierarchical manner to model input information of a financial plan in accordance with one aspect of the present invention.
Figure 6:
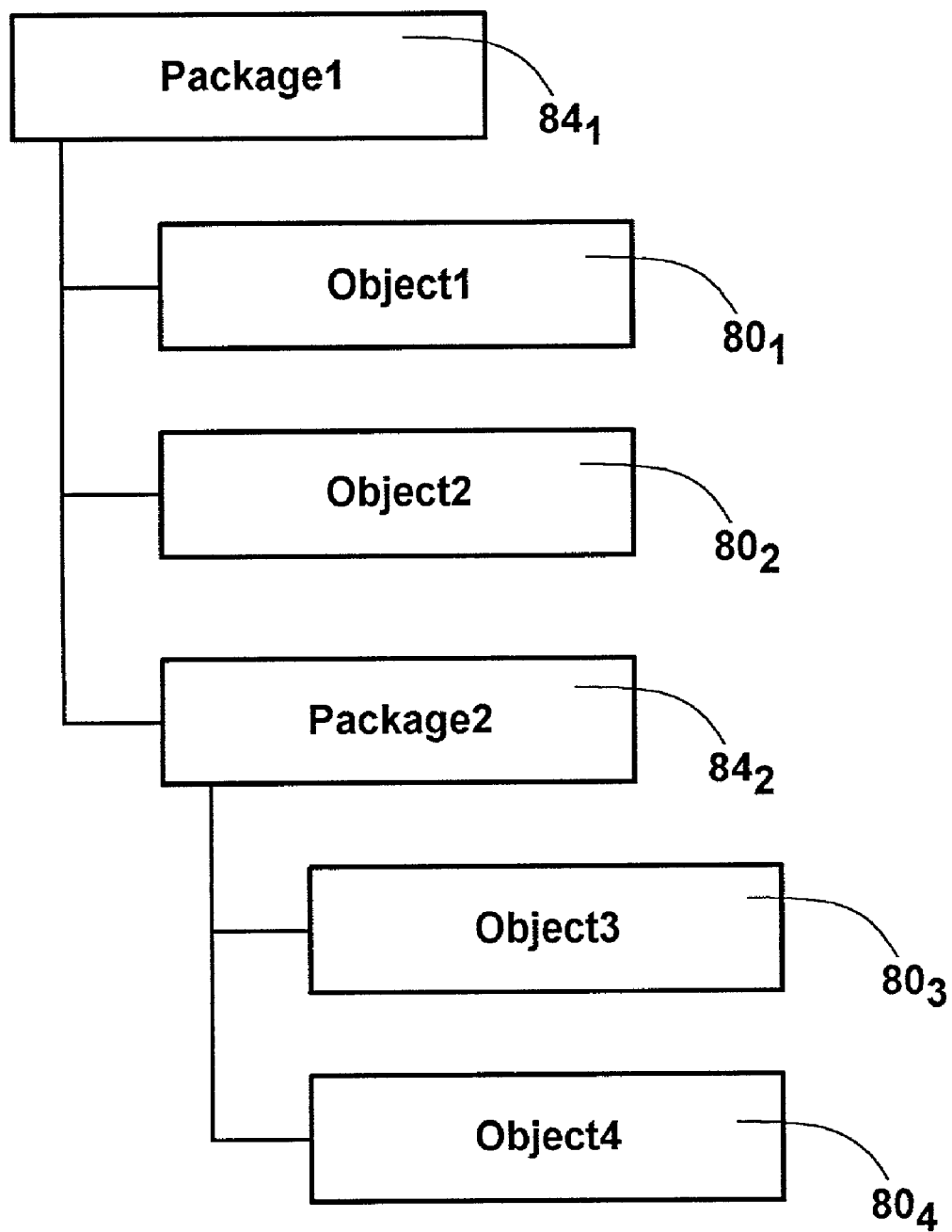
FIGS. 6 and 7 are alternative representations of objects contained within package objects in a hierarchical manner in accordance with one aspect of the present invention.
Figure 7:
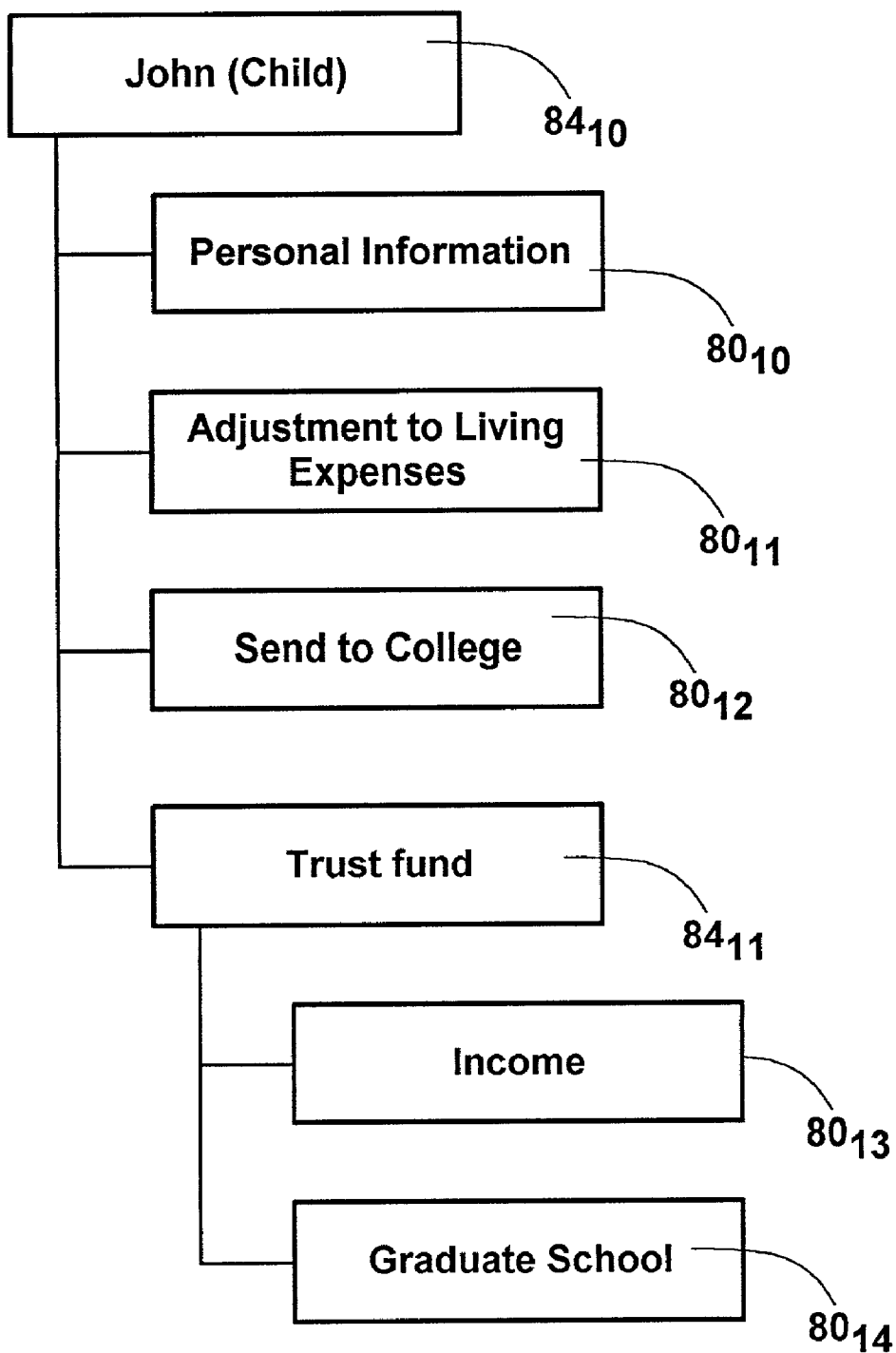

As shown in FIGS. 5-7, when the user creates a financial plan model by inputting information via the user interface 64, the user creates a number of objects $80_1$-$80_m$ that represent the various elements (e.g., people, assets, events, and so on) of their plan. In other words, each object represents some concept that is important to the financial plan, such as an object for each of the persons involved in the plan, an object for each of the assets that the participants possess, objects for liabilities, and so forth. Some of the objects may represent or store present information such as the current value of stock holdings, while others may represent future events, such as an upcoming purchase of a home.

Figure 8:
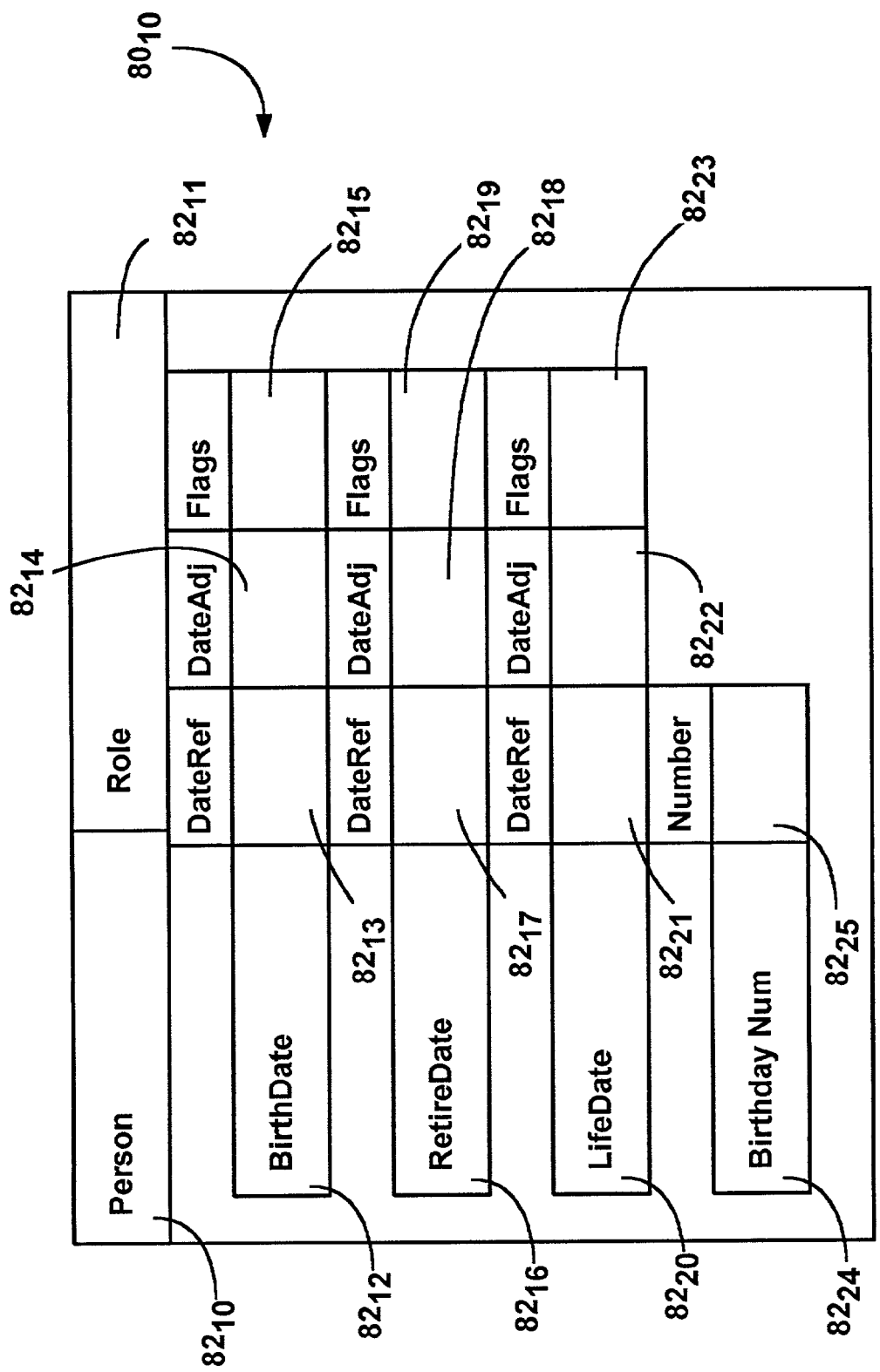
FIG. 8 is a representation of an exemplary object showing fields therein for storing financial information.

As represented in FIG. 5 and FIG. 8, each of these objects (e.g., an object $80_0$) is made up of a number of data fields $82_1$-$82_n$ that hold the actual object data. Although there is no reason an object may not hold any number of fields representing various information, for practical purposes the fields in an object ordinarily are those that make sense for the type of object being maintained. For example, as shown in FIG. 8, the object $80_1$ representing a particular person may be made up of a field $82_{10}$ that maintains the person's name, a role field $82_{11}$, (e.g., child or breadwinner), a date of birth field $82_{13}$, an expected (or actual) retirement date field $82_{17}$, and so forth. In contrast, an asset object (e.g., $80_{21}$ of FIG. 9) is made up of appropriate kinds of fields related to assets, such as a field $82_{23}$ for the name of the asset, and fields for the current value of the asset and the cost basis thereof (not specifically represented).

To organize and to some extent manage the dependencies of the many objects of a model for a plan, package objects $84_1$-$84_k$ (FIGS. 5-7) are provided to hold other objects therein. In general, each package object includes a set of objects that have some general relationship to one another. For example, as shown in FIG. 7, a package $84_{10}$ may hold the objects related to a child, such as the child's person object $80_{10}$ that stores the child's personal information, an object $80_{11}$ directed to expenses related to the child, and an object $80_{12}$ that stores information about college. Packages are also objects, and can be included in other packages. Thus, the child can, for example, have a trust fund package $84_{11}$ under the child package $84_{10}$, with objects thereunder, such as an object $80_{13}$ related to the trust income and an object $80_{14}$ representing graduate school expenses that will come from the trust. Note that many of the objects represent future events, and indeed, the child represented in the package $84_{10}$ may not yet be born. As described in more detail below, because the objects and package objects are arranged hierarchically, certain dependency benefits are obtained, e.g., actions taken to one object may be made to affect objects hierarchically under that object, without having to individually make changes to those lower objects.

In keeping with the present invention, the various objects $80_1$-$80_m$ may be related to other objects and thereby represent the real-world relationships that exist between them. To this end, in addition to the hierarchical object relationships, relationships in the data may be implemented at the field level by using expressions that define relative field values instead of fixed values. These relative dates and amounts are not hard-coded or fixed, and changing the date, amount or relationship of one object in the plan causes an automatic recalculation of other objects in the plan.

By way of example, a user may set an expected person's birth date field (e.g., $82_{13}$ of FIG. 8) to September, 1999, and also set that person's retirement date field (e.g., $82_{17}$) as "birth date" plus sixty-five years. For running a simulation, this is equivalent to directly specifying that the person will retire in September, 2064. However, in keeping with the present invention, if the person is a planned child that actually turns out to be born in August, 1999, a single change to the birth date field $82_{13}$ will automatically be updated in the retirement field $82_{17}$ and in any other fields (e.g., a date of college field) that are made dependent on the date entered in the birth date field $82_{13}$. It is thus very simple for a user to express a date according to when a person in the plan is a certain age, e.g., "Tom's birth date" plus 25 years is the same as saying "when Tom is 25 years old." Note that a granularity of one month is considered sufficient for date values, since accuracy to a specific day is not ordinarily important for purposes of long-term financial planning.

A date range may also be specified by entering a start and a stop date for an object. For example, a salary object may be stopped for a user-specified number of years following the planned birth of a child.

In order to express the relationships between the data, there are presently three types of fields that may contain a reference to another data item. As described above, one such field, a date field, may be specified as a specific date value (e.g. January 1971), a reference to another date field, (e.g., the "purchase date" of the "house object"), or a reference to another date field with an adjustment, (e.g., six months after the "purchase date" of the "house object"). To this end, as described above and as generally shown in FIG. 8, a date reference field (e.g., $82_{17}$) may either store a fixed date value (or NULL), or a reference to a field of another object.

Figure 9:
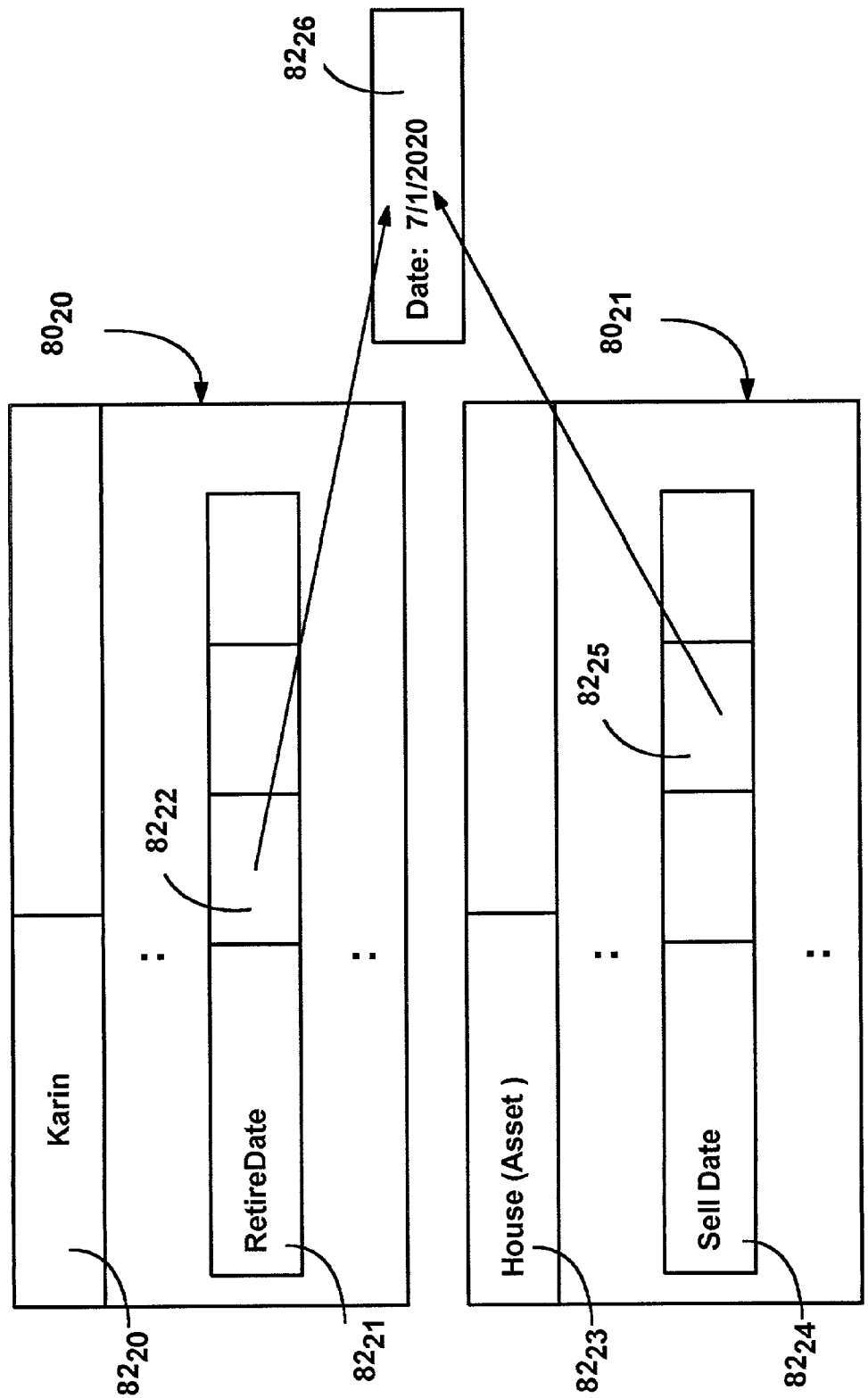
FIG. 9 is a representation of exemplary objects having fields therein dependent on a field of another object in accordance with one aspect of the present invention.
Figure 10:
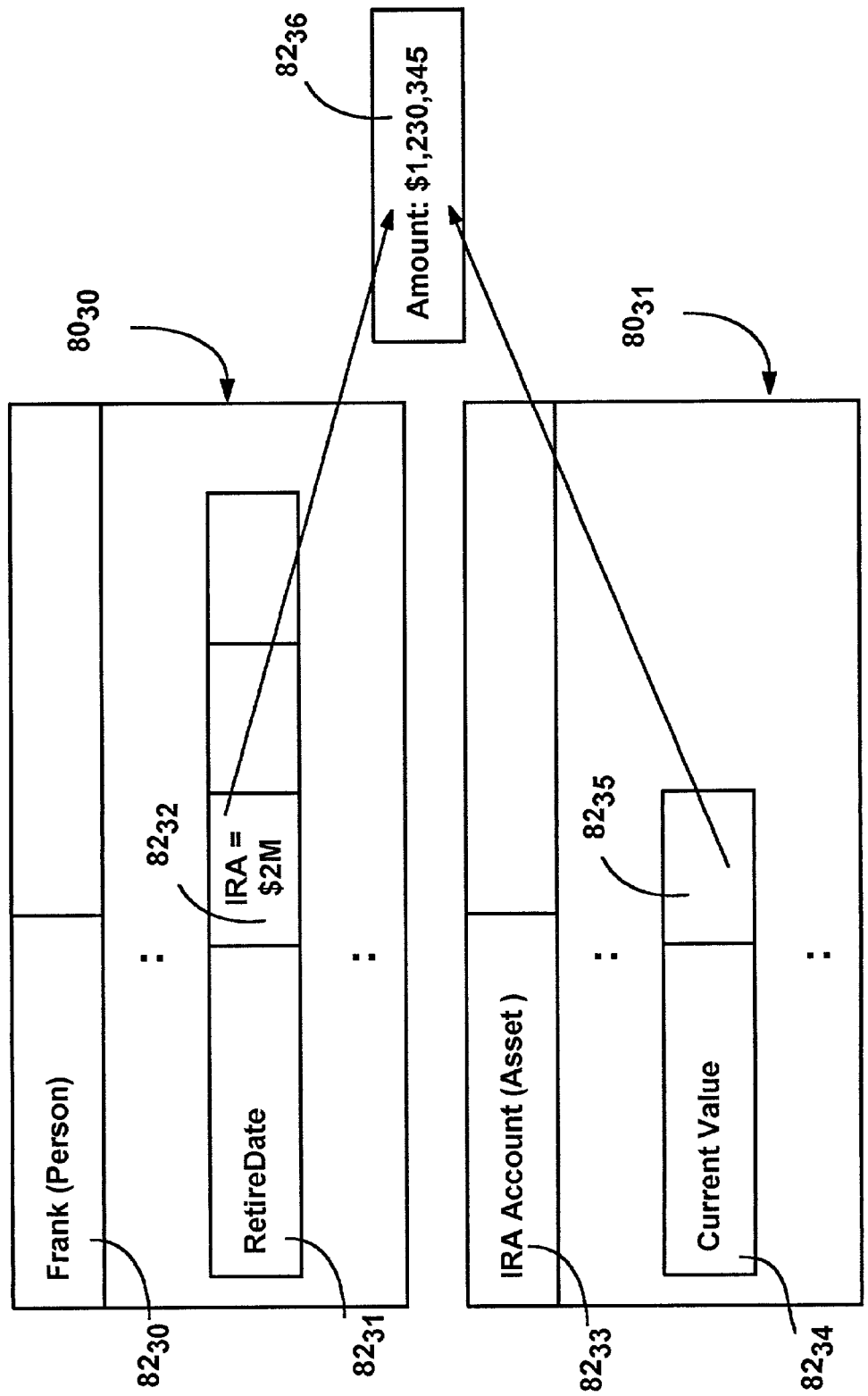
FIG. 10 is a representation of exemplary objects having fields therein dependent on a field of another object, wherein one field is a date field having a date conditional on a value in the other field, in accordance with one aspect of the present invention.

FIG. 9 represents how fields (e.g., $82_{22}$ and $82_{25}$) of respective objects $80_{20}$ and $80_{21}$ object may depend on the information in another field $80_{26}$ by storing a reference (e.g., link or pointer) to that other field. Note that the other field may be in an object, or in some other location that the objects can reference.

In accordance with another aspect of the present invention, another field (e.g., $82_{18}$) is ordinarily provided in the object $80_{10}$ for adjustment of the date of field $82_{17}$. If the object $80_{10}$ has an entry in the date adjustment field $82_{18}$, any time that the retirement date field $82_{17}$ is accessed, the date used will be that of its retirement field $82_{13}$, (which may depend on another field such as $82_{13}$), plus (or minus) any adjustment value date adjustment field $82_{18}$.

A second type of field that may be related to another field in the architecture of the present invention is a field for representing rate values, such as for rates of return on investments, tax rates, and any other percentage value. In keeping with the present invention, a rate field may be specified as a specific rate value, (e.g., twelve percent), a reference to another rate field, (e.g. the "expected rate of return" on "long-term investments"), or a reference to another rate field with an adjustment, (e.g. three percent less than the "rate of inflation").

A third type of field deals with amounts representing currency values. Because of the flexibility that is needed when specifying amounts, there are more options for the amount fields than for the other field types. The basic formula for the definition of an amount field is as follows:

$$([\text{amt\_fld\_ref}]+[\text{amt\_value}])\times([\text{rate\_fld\_ref}]+[\text{rate\_value}])$$

where [amt_fld_ref] represents a reference to another amount field (e.g. the "total value" of the "long-term investments"). This can also be a "NULL" reference, in which case there is no other field that is referenced. In this case, the value of this part of the equation is zero. The [amt_value] represents a currency value (e.g., $5000.00). If this value is zero then it has no effect on the resolved value of the field. The next variable in the formula, [rate_fld_ref], represents a reference to a rate field, (e.g., the "rate of return" of "retirement investments"), as described above. This can also be a "NULL" reference, in which case there is no other field that is referenced and the value of this part of the equation is zero. Lastly, [rate_value] represents a rate value (e.g. fifteen percent). Note that the first two variables in the formula represent an amount, while the last two variables represent a rate multiplier for that amount. Thus, if the [rate value] is zero, then it may have an effect on the total value of the equation. Accordingly, if an amount field does not have a rate multiplier, then the [rate_fld_ref] should be a "NULL" reference and the [rate_value] should be 100% (not zero).

The formula for amount fields allows virtually any value to be represented. The following table sets forth some examples of the way in which an amount field can be used, and the way that the expression would be represented using the above formula (note the syntax, wherein, for example, job.salary means the "salary" field of an object identified as "job"):

| Amount Field Represents: | Entries in Formula: |
| --- | --- |
| $5,000 | (null + 5,000) × (null + 1.00) |
| 10% of house value | ("house.value" + 0) × (null + 0.10) |
| Current Salary plus inflation | ("job.salary" + 0) × ("inflation.rate" + 1.00) |
| $10,000 more than current salary | ("job.salary" + 10,000) × (null + 1.00) |

As described above, the various objects are preferably organized in a database structure 68 for easy access thereto, however, as can be readily appreciated, virtually any type of storage mechanism or scheme that enables one value to be based on another value will suffice for purposes of the present invention. Note, however, that unlike a spreadsheet, with the present invention the user does not have to enter formulas and/or be concerned with the location of the related data (i.e., a cell identifier). Moreover, unlike a spreadsheet which is designed for general purpose use, the user simply responds to questions, fills in information and/or selects choices via a user interface related to the plan, which then writes the proper information into the object for the user, manages the relationships for the user, and runs simulations based on the objects and their relationships. At the same time, unlike a relational database, calculations and simulations are managed by the planner engine 60 for those relationships.

In accordance with another aspect of the present invention, conditional (floating) dates may be entered into a field. By way of example, as shown in FIG. 9, a date may be made relative to a "moving target" by setting the date field e.g., 82$_{32}$ equal to a field e.g., 82$_{36}$ that itself does not have a definite date. Instead, the date field 82$_{32}$ includes some information indicating some condition that needs to be met. Thus, in the example shown in FIG. 9, the retirement date for a person depends on an account reaching two million dollars, which may happen at any time, and indeed, may never happen. Such conditional dates may also include an adjustment value, e.g., buy a vacation house three years after an account is worth one million dollars. As described above, when the financial planner engine 60 runs a simulation based on the information in the objects, it compares the condition to the state of the related data and either takes action or not depending on whether the condition is met. Thus, for example, if a house will be bought three years after an account is worth one million dollars, the house purchase and events that change based on the purchase will not take place until three years after the account reaches one million dollars.

As can be readily appreciated, the combination of hierarchical objects relationships and relative field values allows a great deal of flexibility in creating what may be a very complex data system that can be used to calculate the results of the user's financial plan over time, as well as making it fairly simple for the user to make changes to and update a plan. However, because of the amount of flexibility that is permitted by this architecture, it is possible for a client of the planning engine 60 to create arbitrarily complex plans that other clients may not be able to interpret. To prevent a plan from becoming too complex, although not necessary to the present invention, a standard schema may be defined that provides a framework of recommendations for clients to follow so that some standardization of the format of the data is provided. For example, the standard schema may be used to limit what a user can do, such as by predefining certain objects and the fields therein, and preventing certain types of relationships from being implemented, e.g., the user interface 64 may simply not allow a user to create different types of objects or link certain fields to others. Such a standard schema also simplifies the user interface 64 since only certain choices need to be made available to a user. Thus, although the architecture itself is virtually unlimited, all of its capabilities may not be exposed to users for practical reasons.

In accordance with another aspect of the present invention, objects may be selectively disabled and enabled (301). To this end, the user interface 64 provides the user with a checkbox or the like via which the user can instruct the engine 60 whether to apply a selected object or not. A flag setting in a flag's field (e.g., 82$_{15}$) may be used to disable/enable individual fields, or an entire object (all fields flagged). When preparing for the simulation, the planner engine 60 does not add disabled objects to the list of objects to be processed with the simulation is run, as described above. If an object has some enabled and some disabled fields, the object is listed, however disabled fields are not taken into account when processing the object.

Note that the disabled object can be a package, wherein all objects within that package are disabled, i.e., by putting objects within a package, disabling that package will cause all objects underneath it in the hierarchy to be effectively disabled as well. Thus, using the above example, creating the "savings plan" object within the same package as the "second job" object, and then disabling the package, will prevent either object from affecting the financial plan calculations. Thus, the hierarchical relationship between the objects allows some beneficial behavior to be implemented. Alternatively, as described above, the objects and/or fields within a package can be individually disabled, providing the user with great flexibility in manipulating a plan. Importantly, the user may re-enable a package, object or field that has been disabled for one simulation, without having to recreate the object for another simulation. Thus, for example, a user can quickly see the results of planned events, such as how making or not making a new purchase or selling or not selling will impact the user's retirement.

In accordance with yet another aspect of the present invention, the objects used by the planner 60 may be automatically synchronized with the objects (or information) of another program, such as the OFD software 66. Thus, for example, the financial planner may 60 use information input for a daily-type financial transaction program. The user can individually select which objects or even fields should be synchronized, (the synchronization information may be stored in an appropriate flag field), whereby the planner 60 will know to automatically obtain the object's or field's data from the synchronized information. Once set, synchronization will automatically occur, e.g., the user will not have to manually import data (although this is also possible). A straightforward way in which this may be accomplished is to reference each synchronized field to the fields of the daily program's objects. The referencing process may be automated to an extent when objects and fields are equivalent in the synchronized program's (or programs') data. Further, the user interface 64 may be arranged to obtain the associations from the user as needed, possibly assisting the user by finding similar fields in the other program data from which the user may select for synchronizing with a planner object's field.

As can be seen from the foregoing detailed description, there is provided a method and system that provide for managing relationships between objects of a plan. The method and system are flexible, extensible and fit into models used by existing planning engines.

While the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A computerized method for developing and creating a plan through the use of hierarchically arranged objects, the method comprising:
   accepting input to define a plurality of plan objects, each object comprising a plurality of fields, the fields enabled to contain data, values, offsets, and links;
   accepting input to define a hierarchical relationship of the objects wherein each object is enabled to be designated as above a particular distinct object in the hierarchy or as below a particular distinct object in the hierarchy;
   accepting input to define relationships between fields of objects and other fields of objects;
   accepting input to populate fields of objects with data, values, offsets, or links;
   accepting input enabling or disabling particular objects;
   running a simulation wherein all objects hierarchically dependent upon a disabled object are, themselves, disabled, and calculating data, values, offsets and links for each of said object fields based upon the previously defined relationships between said fields of objects and said other fields of objects and the data, values, offsets, and links of said other fields; and
   producing a plan including data and values having been calculated from the simulation run on the objects.

2. The method of claim 1 wherein input is accepted from a user interface.

3. The method of claim 1 wherein input is accepted from another application.

4. The method of claim 1 wherein relationships between fields of objects and other fields of objects comprise relationships between fields of objects and fields of other objects.

5. The method of claim 1 wherein relationships between fields comprise relationships of dates, amounts, or rates.

6. The method of claim 1 wherein data and values are financial data and values.

7. The method of claim 1 wherein data and values are dates.

8. The method of claim 1 wherein links are links to data and values in external databases.

9. A computer program product comprising a computer-readable storage medium storing computer-executable instructions such that when executed, implement a method comprising:
   accepting input to define a plurality of plan objects, each object comprising a plurality of fields, the fields enabled to contain data, values, offsets, and links;
   accepting input to define a hierarchical relationship of the objects wherein each object is enabled to be designated as above a particular distinct object in the hierarchy or as below a particular distinct object in the hierarchy;
   accepting input to define relationships between fields of objects and other fields of objects;
   accepting input to populate fields of objects with data, values, offsets, or links;
   accepting input enabling or disabling particular objects;
   running a simulation wherein all objects hierarchically dependent upon a disabled object are, themselves, disabled, and calculating data, values, offsets and links for each of said object fields based upon the previously defined relationships between said fields of objects and said other fields of objects and the data, values, offsets, and links of said other fields; and
   producing a plan including data and values having been calculated from the simulation run on the objects.

10. The computer program product of claim 9 wherein input is accepted from a user interface.

11. The computer program product of claim 9 wherein input is accepted from another application.

12. The computer program product of claim 9 wherein relationships between fields of objects and other fields of objects comprise relationships between fields of objects and fields of other objects.

13. The computer program product of claim 9 wherein relationships between fields comprise relationships of dates, amounts, or rates.

14. The computer program product of claim 9 wherein data and values are financial data and values.

15. The computer program product of claim 9 wherein data and values are dates.

16. The computer program product of claim 9 wherein links are links to data and values in external databases.

17. A computing system comprising one or more processors and one or more computer-readable storage media storing computer-executable instructions that, when executed by the one or more processors, implement a method comprising:
   accepting input to define a plurality of plan objects, each object comprising a plurality of fields, the fields enabled to contain data, values, offsets, and links;
   accepting input to define a hierarchical relationship of the objects wherein each object is enabled to be designated as above a particular distinct object in the hierarchy or as below a particular distinct object in the hierarchy;

accepting input to define relationships between fields of objects and other fields of objects;

accepting input to populate fields of objects with data, values, offsets, or links;

accepting input enabling or disabling particular objects;

running a simulation wherein all objects hierarchically dependent upon a disabled object are, themselves, disabled, and calculating data, values, offsets and links for each of said object fields based upon the previously defined relationships between said fields of objects and said other fields of objects and the data, values, offsets, and links of said other fields; and producing a plan including data and values having been calculated from the simulation run on the objects.

18. The system of claim 17 wherein input is accepted from a user interface.

19. The system of claim 17 wherein input is accepted from another application.

20. The system of claim 17 wherein relationships between fields of objects and other fields of objects comprise relationships between fields of objects and fields of other objects.

21. The system of claim 17 wherein relationships between fields comprise relationships of dates, amounts, or rates.

22. The system of claim 17 wherein data and values are financial data and values.

23. The system of claim 17 wherein data and values are dates.

24. The system of claim 17 wherein links are links to data and values in external databases.

* * * * *